(12) United States Patent
Mielke et al.

(10) Patent No.: US 12,508,863 B2
(45) Date of Patent: Dec. 30, 2025

(54) TWIST BEAM AXLE FOR A MOTOR VEHICLE

(71) Applicant: BENTELER AUTOMOBILTECHNIK GMBH, Paderborn (DE)

(72) Inventors: Oliver Mielke, Altenbeken (DE); Vitalis Rudi, Paderborn (DE); Erik Schultz, Paderborn (DE); Vaclav Hanzlik, Liberec (CZ)

(73) Assignee: BENTELER AUTOMOBILTECHNIK GMBH, Paderborn (DE)

( * ) Notice: Subject to any disclaimer, the term of this patent is extended or adjusted under 35 U.S.C. 154(b) by 0 days.

(21) Appl. No.: 18/940,832

(22) Filed: Nov. 8, 2024

(65) Prior Publication Data

US 2025/0153532 A1   May 15, 2025

(30) Foreign Application Priority Data

Nov. 10, 2023  (EP) ..................................... 23209133

(51) Int. Cl.
*B60G 21/05* (2006.01)

(52) U.S. Cl.
CPC ........ *B60G 21/052* (2013.01); *B60G 2200/21* (2013.01); *B60G 2206/20* (2013.01); *B60G 2206/8201* (2013.01)

(58) Field of Classification Search
CPC ............... B60G 21/051; B60G 21/052; B60G 2200/21; B60G 2200/22; B60G 2200/23; B60G 2204/148; B60G 2206/20; B60G 2206/8201

USPC .................................................. 280/124.106
See application file for complete search history.

(56) References Cited

U.S. PATENT DOCUMENTS

2022/0332161 A1 * 10/2022 Dari ....................... B60G 21/05

FOREIGN PATENT DOCUMENTS

| CN | 201970825 U | * | 9/2011 | ........... B60G 21/051 |
|----|-------------|---|--------|------------------------|
| CN | 103818209 A | * | 5/2014 | |
| CN | 104786773 A | * | 7/2015 | ........... B60G 21/051 |
| CN | 106240274 A | * | 12/2016 | ........... B60G 21/051 |
| DE | 2740948 A1 | * | 3/1979 | ........... B60G 21/051 |
| DE | 19649076 A1 | * | 5/1998 | ........... B60G 21/051 |
| DE | 19808172 A1 | * | 9/1998 | ........... B60G 21/051 |
| DE | 19928537 A1 | | 1/2001 | |
| DE | 102012104999 A1 | * | 12/2013 | ........... B60G 21/051 |

(Continued)

OTHER PUBLICATIONS

Description Translation for JP H07276942A from Espacenet (Year: 1995).*

(Continued)

*Primary Examiner* — Jason D Shanske
*Assistant Examiner* — Daniel M. Keck
(74) *Attorney, Agent, or Firm* — HAUPTMAN HAM, LLP

(57) ABSTRACT

A twist beam axle for a motor vehicle, having two trailing arms which are connected by a torsion profile, and the torsion profile is integrally joined at its longitudinal end sections to the trailing arms by a weld seam, and the torsion profile has a relief bead in its respective longitudinal end sections in the area of the weld seam, and the relief bead has a longitudinal extension and is oriented transversely to the course of the weld seam in the direction of its longitudinal extension.

6 Claims, 3 Drawing Sheets

(56) References Cited

FOREIGN PATENT DOCUMENTS

| DE | 102010045919 | B4 |   | 4/2016  |            |
|----|--------------|----|---|---------|------------|
| DE | 102015209039 | A1 |   | 11/2016 |            |
| DE | 102015015519 | B4 | * | 10/2021 | B60G 21/051 |
| EP | 2143511      | A1 |   | 1/2010  |            |
| JP | H07276942    | A  | * | 10/1995 |            |
| JP | 2011131700   | A  | * | 7/2011  | B60G 21/051 |
| KR | 100774332    | B1 | * | 11/2007 | B60G 21/052 |
| KR | 100902837    | B1 | * | 6/2009  | B60G 11/18 |
| KR | 10-2010-0006284 | A |  | 1/2010  |            |
| RU | 2333844      | C2 | * | 9/2008  | B60G 11/20 |

OTHER PUBLICATIONS

Description Translation for DE 102010045919 from Espacenet (Year: 2016).*

Extended European Search Report, Application No. EP23209133.0, mailed May 3, 2024, 14pp.

* cited by examiner

TWIST BEAM AXLE FOR A MOTOR VEHICLE

RELATED APPLICATIONS

The present application claims priority of European Application Number 23209133.0 filed Nov. 10, 2023, the disclosure of which is hereby incorporated by reference herein in its entirety.

FIELD

The present disclosure relates to a twist beam axle for a motor vehicle.

BACKGROUND

Twist beam axles for motor vehicles, which connect the wheels to the body, are used as the rear axle. The twist beam axles include two bending-resistant and torsion-resistant trailing arms and a torsion profile that connects the two trailing arms. Special requirements are placed on corresponding torsion profiles. The respective end sections are to be made as stiff as possible to avoid undesired changes in track and camber. At the same time, the torsion profiles are also to be torsion-flexible, which is achieved by a torsion-flexible middle section of the torsion profile.

The torsion profile is materially bonded to the trailing arm at its respective longitudinal end section by means of a weld seam. In the transition area between the trailing arms and the torsion profile and in the weld seams, high stress peaks sometimes occur during operation of the motor vehicle. These are triggered, for example, by the vertical forces transmitted from the wheels to the twist beam axle and impair the service life of the weld seams and thus of the twist beam axle itself.

To increase the durability of the twist beam axle, there are two options which reduce the stresses occurring in the connection area between the trailing arms and the torsion profile. On the one hand, the thickness or material thickness of the longitudinal end sections of the torsion profile and the adjacent trailing arms are able to be increased, for example, by additional reinforcement plates. However, this is associated with high costs and also increases the weight of the twist beam axle, which is detrimental to the driving behavior as well as the fuel consumption of the motor vehicle. On the other hand, the weld seam is able to be processed by means of a shot peening process, which, however, also significantly increases the production costs of the twist beam axle.

SUMMARY

The object of the present disclosure is to provide a twist beam axle having the lowest possible weight, in which the stresses acting on the weld seams in the connection area between the trailing arm and the torsion profile are reduced during operation of the motor vehicle as the area of application.

This object is achieved by a twist beam axle.

The twist beam axle for a motor vehicle according to the present disclosure has two trailing arms which are connected by a torsion profile. When the twist beam axle is used in a motor vehicle, the two trailing arms of the twist beam axle are oriented in the longitudinal direction of the vehicle, while the torsion profile connects the two trailing arms in the transverse direction of the vehicle. The twist beam axle connects the wheels to the body of the motor vehicle. The torsion profile is materially bonded to the trailing arms at its longitudinal end sections by means of a weld seam. The weld seam follows the geometry of the components to be connected.

In at least one embodiment of the present disclosure, the torsion profile has at least one relief bead in its respective longitudinal end sections in the area of the weld seam. The relief bead has a longitudinal extension and is oriented transversely to the course of the weld seam in the direction of its longitudinal extension. The vertical forces transmitted from the wheels to the twist beam axle subject the torsion profile to a bending moment, which results in stresses in the transition area between the trailing arms and the torsion profile and in the weld seams connecting them. This is able to have a detrimental effect on the service life of the weld seams and thus of the twist beam axle. By means of the relief beads arranged according to the present disclosure, the stresses acting on the weld seams are reduced by being absorbed by the relief beads. This is able to increase the service life of the weld seams and thus of the twist beam axle. The alignment of the relief bead transverse to the course of the weld seam has proven to be advantageous for absorbing the stresses that occur.

Due to the arrangement of the relief beads according to the present disclosure, the weight of the twist beam axle is not increased and the formation of the relief beads in the torsion profile is cost-effective.

The relief bead has a width on its side oriented towards the weld seam that corresponds to the length of a weld seam section in which the highest stresses occur when the torsion profile is subjected to a bending moment. In at least one embodiment of the present disclosure, by forming a corresponding width the high stress peaks are effectively absorbed by the relief bead. The stress acting on the weld seam is reduced, thus increasing the service life of the twist beam axle. The length of the weld seam section refers to the length of the weld seam in this section.

The weld seam section in which the highest stresses occur when the torsion profile is subjected to a bending moment based on the weld seam course between the trailing arm and the torsion profile. This weld seam section corresponds to the transition area of the weld seam from a substantially vertical course with respect to the trailing arm to a substantially horizontal course.

In at least one embodiment of the present disclosure, the relief bead tapers in relation to its width along the longitudinal side in the opposite direction to the respective weld seam. A corresponding taper of the relief bead ensures that the stresses arising in the connection area between the trailing arm and the torsion profile are able to be deliberately diverted into a middle section of the torsion profile.

In at least one embodiment of the present disclosure, the relief bead continuously merges into the shape of the torsion profile in the opposite direction to the weld seam. This has two advantages. On the one hand, the relief bead is able to be formed without introducing an undercut in the torsion profile. This is advantageous for the manufacturing process of the twist beam axle. On the other hand, a correspondingly continuous transition in the shape of the torsion profile ensures that the stresses absorbed by the relief bead are passed on to the middle section of the torsion profile. In at least one embodiment of the present disclosure, the relief bead merges into an outer surface of the torsion profile.

In at least one embodiment of the present disclosure, the relief bead is arranged in an edge area of the torsion profile. This means that the relief bead is arranged laterally offset to the central longitudinal axis of the torsion profile. Since the highest stresses occur in the edge areas of the transition area between the trailing arm and the torsion profile, the stress peaks are able to be effectively absorbed by the relief beads arranged in the edge area.

In at least one embodiment of the present disclosure, the side of the relief bead oriented towards the weld seam is arranged opposite to the weld seam section in which the highest stresses occur when the torsion profile is subjected to a bending moment.

In at least one embodiment of the present disclosure, the relief bead is oriented in the direction of its longitudinal extension perpendicular to the course of the opposite weld seam section.

The relief bead has a depth which corresponds to 25 to 200% of the local wall thickness of the torsion profile, 30 to 60%, or 40 to 60%. The depth refers to the maximum depth of the relief bead, which is arranged in the area of the relief bead oriented towards the weld seam.

In at least one embodiment of the present disclosure, the torsion profile has two relief beads in each of its longitudinal end sections in the area of the weld seam. The stresses occurring in the transition area between the trailing arms and the torsion profile are further reduced. The relief beads are arranged at the respective edge areas of the torsion profile.

The torsion profile has a double-walled U-shaped middle section in cross section, which widens towards the longitudinal end sections to form an oval-shaped profile. This enables a circumferential welding connection of the torsion profile to the respective trailing arm.

BRIEF DESCRIPTION OF THE DRAWINGS

Further advantages, features, properties, and aspects of the present disclosure are the subject matter of the following description. Various embodiments are shown in the schematic figures. These simplify the understanding of the present disclosure. In the figures.

DETAILED DESCRIPTION

Figure 1:
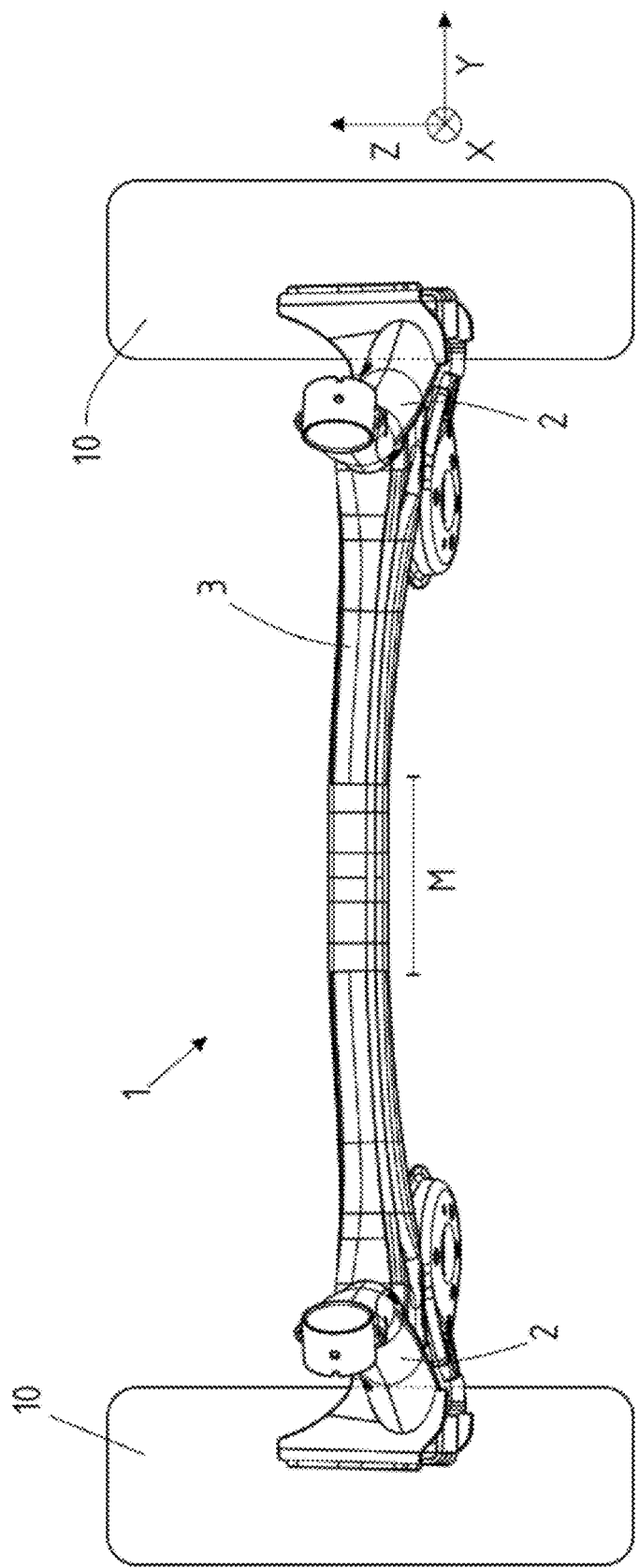
FIG. 1 shows a twist beam axle in a front view according to at least one embodiment of the present disclosure.

FIG. 1 shows a twist beam axle 1 according to at least one embodiment of the present disclosure, which has two trailing arms 2 which are connected by a torsion profile 3. The twist beam axle 1 connects the rear wheels 10 in a motor vehicle to a body (not shown in detail). The two trailing arms 2 are oriented in the vehicle longitudinal direction X, while the torsion profile 3 connects the two trailing arms 2 to one another in the vehicle transverse direction Y. The torsion profile 3 has a torsion-flexible middle section M.

Figure 2:
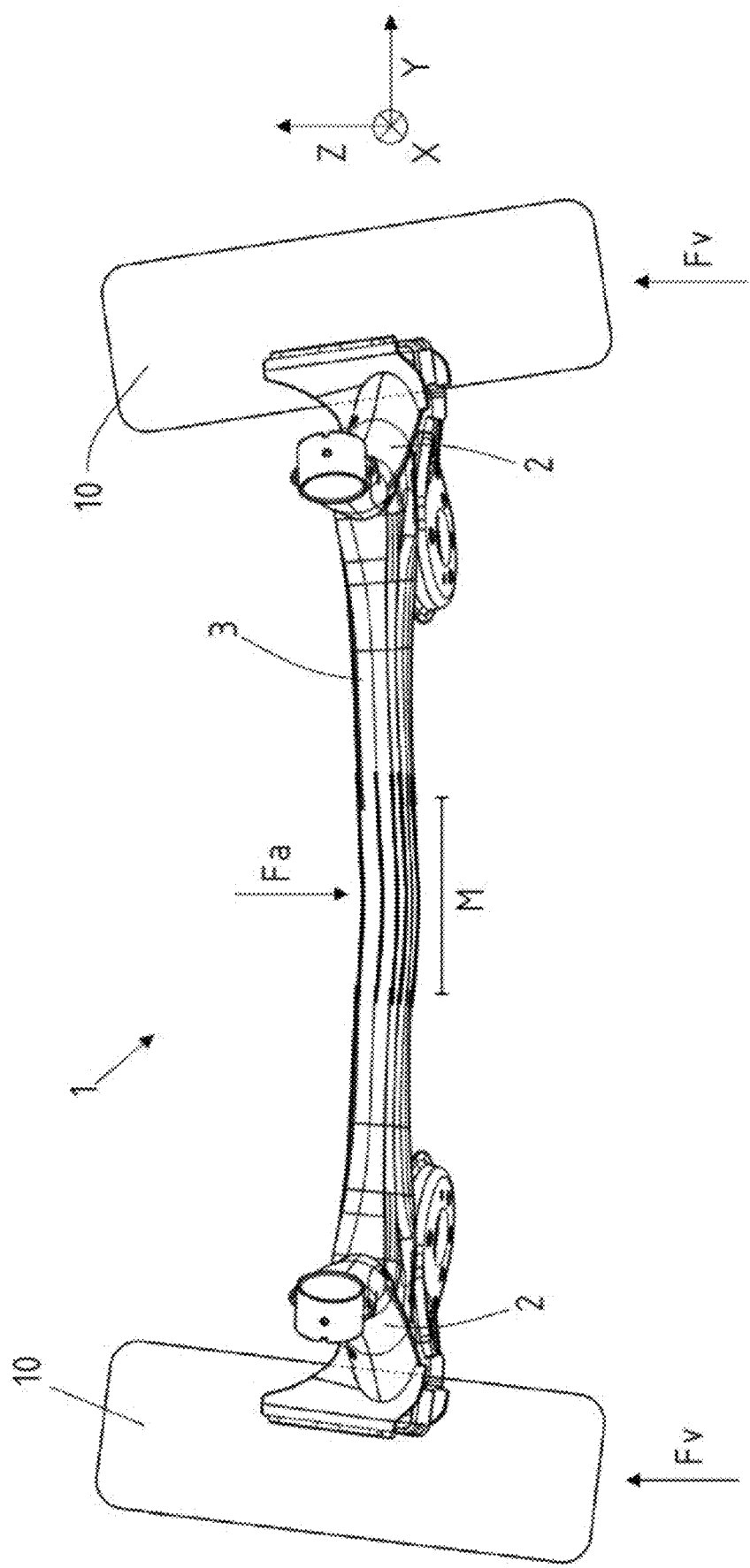
FIG. 2 shows the twist beam axle being subjected to a vertical force in a front view according to at least one embodiment of the present disclosure.

In FIG. 2, the twist beam axle 1 is shown in a state in which a vertical impact acts on each of the wheels 10 of the motor vehicle, which transmits a vertical force Fv to the respective wheel 10 in the vertical direction Z. Due to the coupling of the wheels 10 with the twist beam axle 1, the wheels 10 are inclined in the direction of the twist beam axle 1. Due to the resulting bending moment, the middle section M of the torsion profile 3 is deformed. This is shown by the comparison between FIG. 1 and FIG. 2. The twist beam 1 is subjected to high loads in the form of local stresses in the transition area between the rigid trailing arms 2 and the torsion profile 3.

Figure 3:
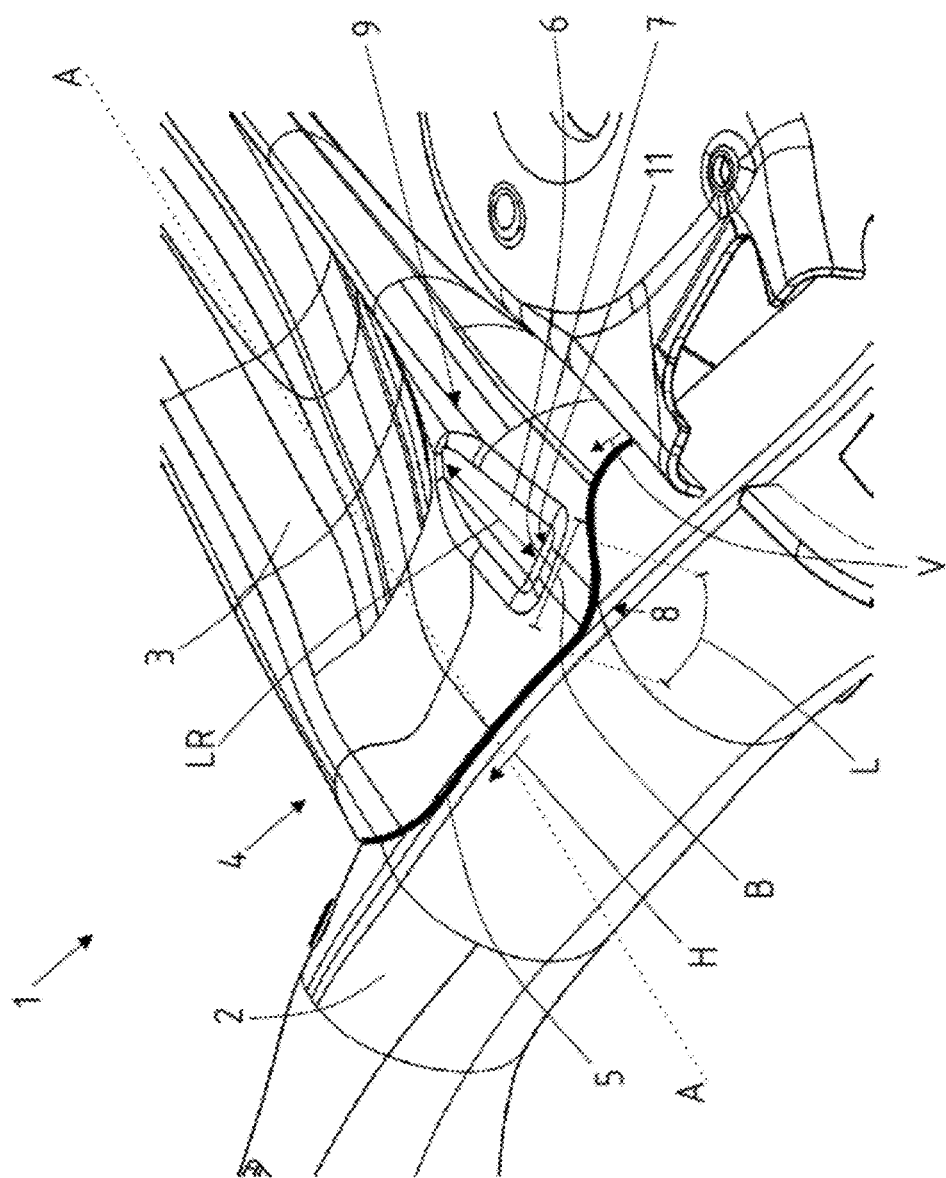
FIG. 3 shows a detailed view of the twist beam axle in a perspective according to at least one embodiment of the present disclosure.

FIG. 3 shows a detailed view of the transition area between the torsion profile 3 and one of the trailing arms 2 of the twist beam axle 1. The torsion profile 3 is materially bonded to the trailing arms 2 at its longitudinal end sections 4 by means of a weld seam 5. The weld seam 5 follows the geometry of the components to be connected. The previously mentioned stresses in the transition area therefore act on and in the weld seam 5.

The torsion profile 3 has a relief bead 6 in its respective longitudinal end sections 4 in the area of the weld seam 5. Due to the arrangement of the relief bead 6 according to the present disclosure, the stresses acting on the weld seam 5 are absorbed by the relief bead 6. The load on the weld seam 5 is reduced accordingly, which results in a longer service life of the twist beam axle 1. The relief beads 6 do not increase the weight of the twist beam axle 1 and are also producible cost-effectively.

The middle section M of the torsion profile 3 has a double-walled and U-shaped cross section. In the direction of the longitudinal end sections 4, the cross section of the torsion profile 4 widens to form a circular profile. This enables a circumferential welding connection of the torsion profile 3 to the respective trailing arm 2.

According to the present disclosure, the relief bead 6 has a longitudinal extension LR and is oriented in the direction of its longitudinal extension LR transversely to the course of the adjacent weld seam 5. This arrangement of the relief bead 6 has proven to be advantageous for absorbing the stresses acting on the weld seams 5. In addition, due to the alignment transverse to the course of the weld seam 5, the stresses are able to be diverted via the relief bead 6 into the middle section M of the torsion profile 3.

The relief bead 6 has a width B on its side 7 oriented towards the weld seam 5 that corresponds to the length L of a weld seam section 8 in which the highest stresses occur when the torsion profile 3 is subjected to a bending moment. In at least one embodiment of the present disclosure, by adapting the width B to the length L of the weld seam section 8 in the connection area between the trailing arm 2 and the torsion profile 3, stresses occurring are effectively transferred to the relief bead 6, so that the stress peaks that would otherwise act on the weld seam 5 are avoided.

In at least one embodiment of the present disclosure, based on the weld seam course between the torsion profile 3 and the trailing arm 2, at which weld seam sections 8 the highest stresses occur when the torsion profile 3 is subjected to a bending moment. In at least one embodiment of the present disclosure, the weld seam section 8 corresponds to the transition area of the weld seam 5 from a substantially vertical course V with respect to the trailing arm 2 to a substantially horizontal course H. As able to be seen in FIG. 3, the torsion profile 3 is completely welded to the trailing arm 2 at its longitudinal end sections 4. In relation to the installation direction of the twist beam axle 1 in the motor vehicle, the weld seam 5 thus changes from a substantially vertical course V to a substantially horizontal course H.

In relation to its width B, the relief bead 6 tapers longitudinally in the opposite direction to the weld seam 5. By appropriately designing the relief bead 6, the stresses absorbed thereby are passed on in the direction of the middle section M of the torsion profile 3.

The relief bead 6 continuously merges into the shape of the torsion profile 3 in the opposite direction to the weld seam 5. On the one hand, this has the advantage that no undercut is required for the formation of the relief bead 6, which is advantageous for the production process of the torsion profile 3. On the other hand, the continuous transition of the relief bead 6 into the shape of the torsion profile 3 ensures that the stresses absorbed by the relief bead 6 are passed on to the middle section M of the torsion profile 3.

The relief bead 6 has a depth corresponding to 25 to 200% of the local wall thickness of the torsion profile 3. The depth refers to the maximum depth of the relief bead 6, which is arranged in the area 11 of the relief bead 6 oriented towards the weld seam 5.

The relief bead 6 is arranged in an edge area 9 of the torsion profile 3. This means that the relief bead 6 is arranged laterally offset to the central longitudinal axis A of the torsion profile 3. Since corresponding stress peaks occur in the edge area of the transition area between the trailing arms 2 and the torsion profile 3 when the torsion profile 3 is subjected to bending stress, the stresses is able to be absorbed by arranging the relief beads 6 in the edge area 9 of the torsion profile 3.

The side 7 of the relief bead oriented towards the weld seam 5 is arranged opposite to the weld seam section 8. This arrangement has proven to be advantageous for absorbing corresponding stresses.

The torsion profile 3 is able to also have two relief beads 6 in each of its longitudinal end sections 4 in the area of the weld seam 5. This is not shown in the figures. By forming two relief beads 6 each, the stress occurring in the transition area between the trailing arms 2 and the torsion profile 3 is able to be absorbed.

The foregoing description of some embodiments of the disclosure has been presented for purposes of illustration and description. The description is not intended to be exhaustive or to limit the disclosure to the precise form disclosed, and modifications and variations are possible in light of the above teachings. The specifically described embodiments explain the principles and practical applications to enable one ordinarily skilled in the art to utilize various embodiments and with various modifications as are suited to the particular use contemplated. Various changes, substitutions and alterations can be made hereto without departing from the spirit and scope of the disclosure.

The invention claimed is:

1. A twist beam axle for a motor vehicle, the twist beam axle comprising:
    a torsion profile; and
    two trailing arms connected by the torsion profile,
    wherein the torsion profile is integrally joined at each of longitudinal end sections thereof to a corresponding trailing arm of the two trailing arms by a weld seam,
    wherein each of the longitudinal end sections has a relief bead in proximity to the weld seam by which the longitudinal end section is joined to the corresponding trailing arm,
    wherein the relief bead has a longitudinal extension and is oriented transversely to a course of the weld seam in a direction of the longitudinal extension,
    wherein the weld seam has a weld seam section in which highest stresses occur upon the torsion profile being subjected to a bending moment,
    wherein the relief bead has a width on a side thereof oriented towards the weld seam, and the width of the relief bead corresponds to a length of the weld seam section,
    wherein the weld seam section in which the highest stresses occur upon the torsion profile being subjected to the bending moment corresponds to a transition area of the weld seam from a substantially vertical course to a substantially horizontal course with respect to the corresponding trailing arm, and
    wherein the relief bead is arranged laterally offset with respect to a central longitudinal axis of the torsion profile, and the torsion profile has a double-walled U-shaped middle section in cross section which widens towards the longitudinal end sections to form an oval-shaped profile.

2. The twist beam axle according to claim 1, wherein the relief bead tapers longitudinally in an opposite direction to the weld seam with respect to the width of the relief bead.

3. The twist beam axle according to claim 1, wherein the relief bead merges continuously into the torsion profile in an opposite direction to the weld seam.

4. The twist beam axle according to claim 1, wherein the relief bead is arranged in an edge area of the torsion profile.

5. The twist beam axle according to claim 1, wherein the side of the relief bead oriented towards the weld seam is arranged opposite to the weld seam section in which the highest stresses occur upon the torsion profile being subjected to the bending moment.

6. The twist beam axle according to claim 1, wherein each of the longitudinal end sections has two relief beads in the proximity to the weld seam by which the longitudinal end section is joined to the corresponding trailing arm.

* * * * *